Aug. 8, 1967  O. H. INGBER  3,334,503
APPARATUS FOR CONTROLLING THE TRANSVERSE DIMENSION OF AN
ELONGATED OBJECT SUCH AS WIRE, CABLE, TUBE, TAPE
DURING ITS MANUFACTURE
Filed Aug. 6, 1963  6 Sheets-Sheet 1

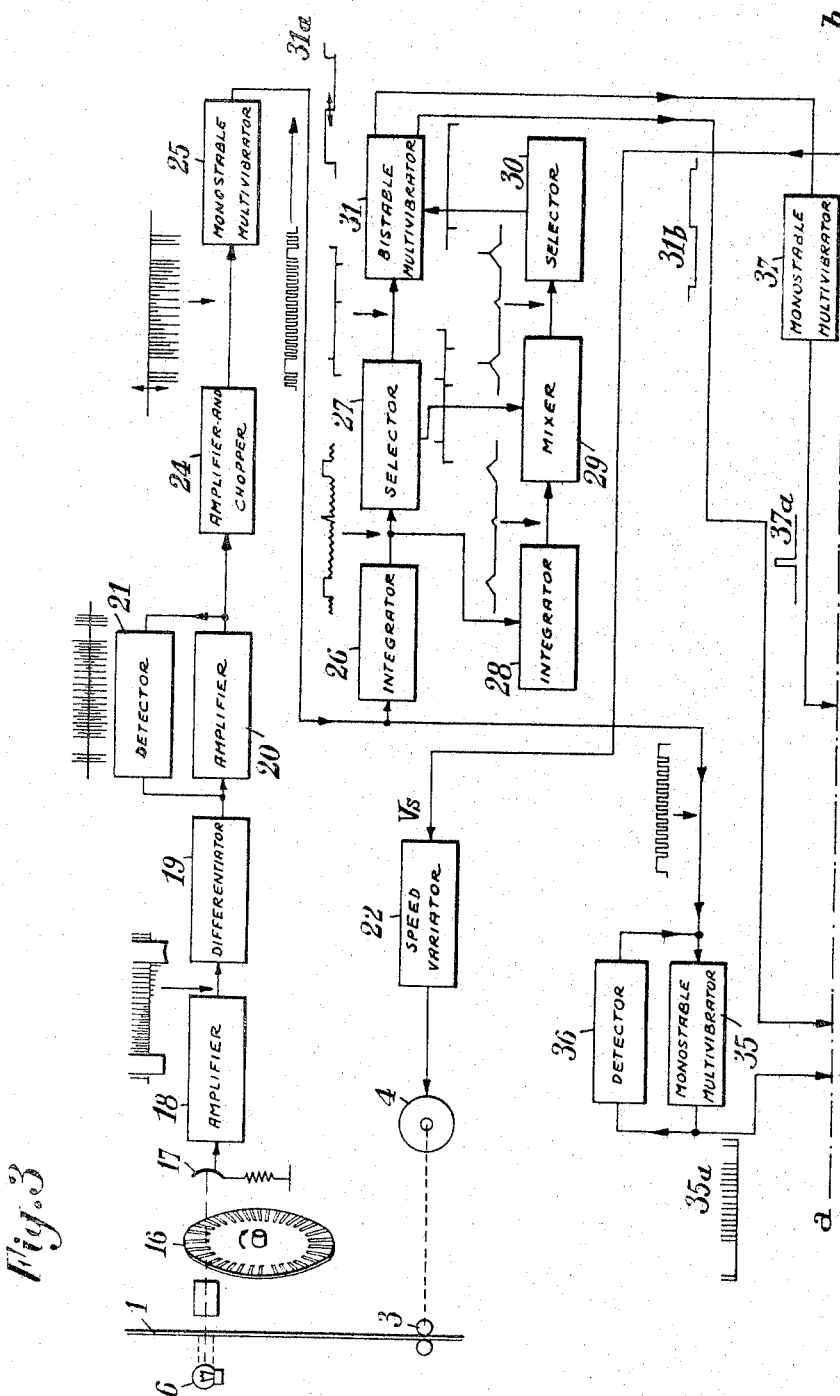

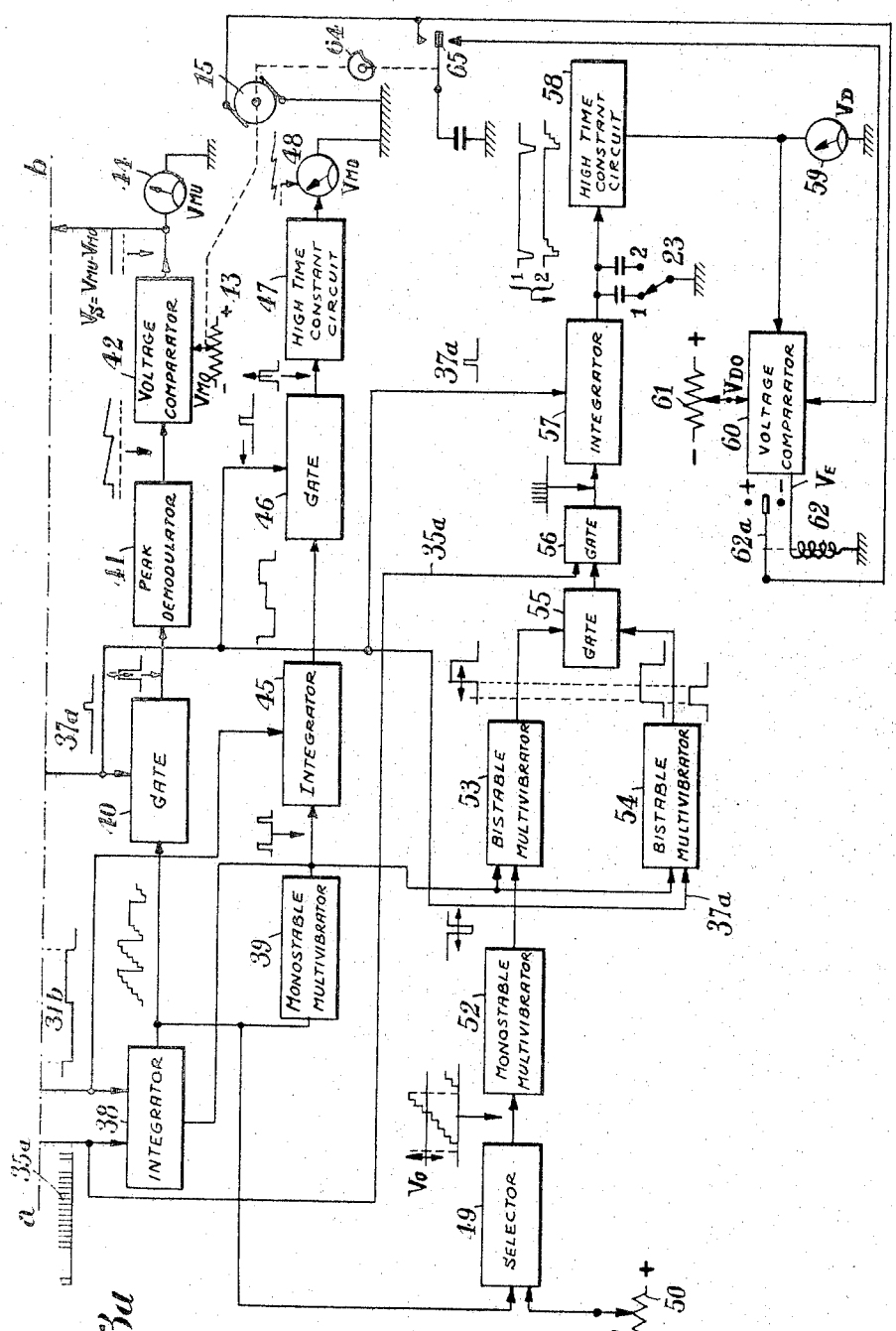

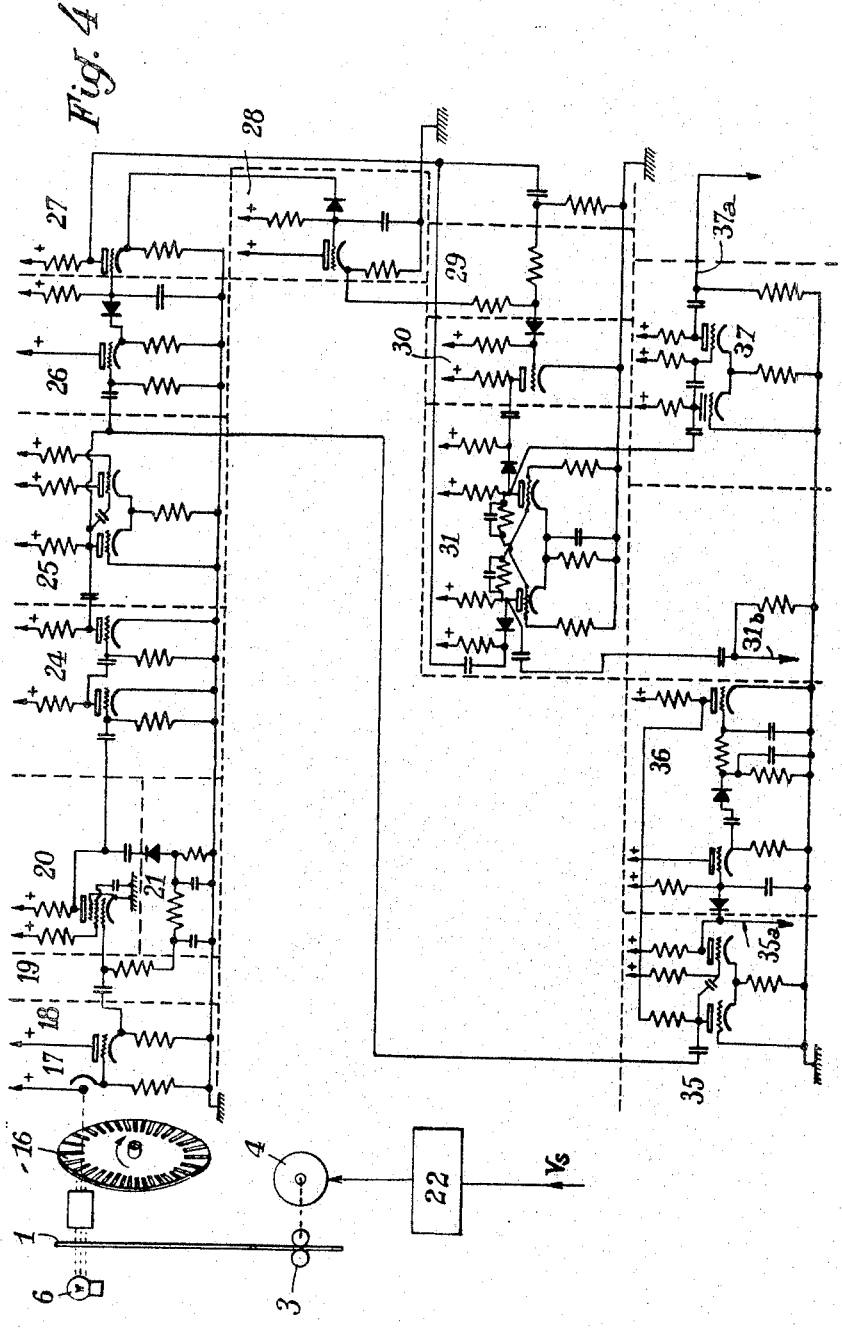

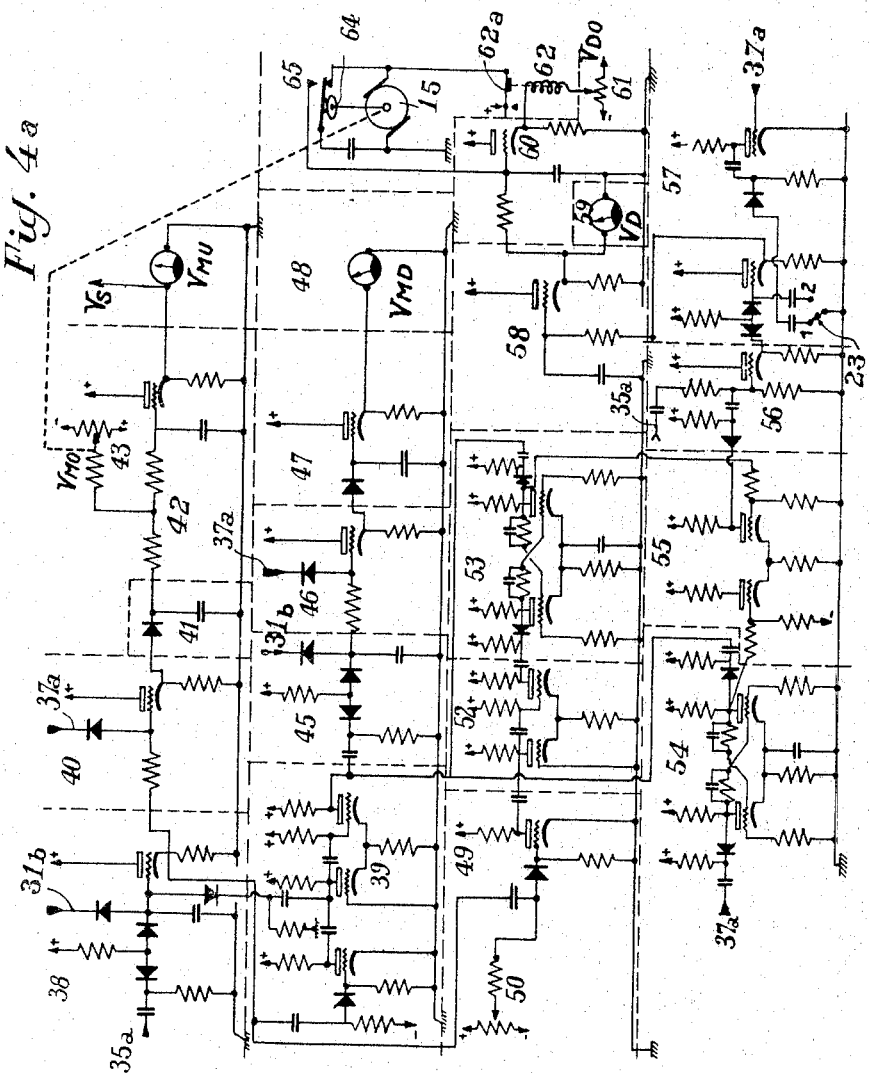

United States Patent Office 3,334,503
Patented Aug. 8, 1967

3,334,503
APPARATUS FOR CONTROLLING THE TRANSVERSE DIMENSION OF AN ELONGATED OBJECT SUCH AS WIRE, CABLE, TUBE, TAPE DURING ITS MANUFACTURE
Oscar Henri Ingber, 15 Blvd. du General Koenig, Neuilly-sur-Seine, France
Filed Aug. 6, 1963, Ser. No. 300,241
Claims priority, application France, Nov. 29, 1957, Patent 1,196,966; 1st addition, May 5, 1958, 764,774; 2nd addition, Nov. 7, 1958, 778,714; 3rd addition, May 29, 1959, 796,021
3 Claims. (Cl. 72—15)

The present patent application is a continuation-in-part of my previous patent application Ser. No. 32,643, filed on May 31, 1960, and entitled: "Device for Measuring the Width or Diameter of Fixed or Movable Tapes, Wires, Tubes, Bars and the Like, which in turn is a continuation-in-part of my application Ser. No. 776,307, filed Nov. 25, 1958, now Patent No. 3,017,801.

The present invention relates to an apparatus for controlling the transverse dimension of an object of elongated shape, such as a wire, cable, tube, tape or the like during its manufacture.

Various apparatus are already known which permit of measuring the local value of the transverse dimension of an object such as a wire, cable, etc. These apparatus are usually inadequate for controlling the machine manufacturing the elongated object, for example an electric cable, with a view to keep the transverse dimensions of this object as close as possible to the optimum value. This is notably the case of the manufacture of electric cable wherein the thickness of the insulating layer should theoretically not drop below a predetermined lower limit corresponding to the rated cable diameter.

It is the essential object of the present invention to provide an apparatus for adjusting at any moment the local value of the transverse dimension of the manufactured object, in order to comply with a predetermined statistical law.

Another object of the invention is to provide means for giving a mean value of the measured local dimension during the passage of the being measured object.

Another object of the invention is to provide means to establish a differential voltage between that representing the mean value of the local dimension measured and another adjustable voltage constituting a "standard" that one desires to impose as the said mean value during the manufacture of the object measured, said differential voltage being utilized to control the machine manufacturing this object so as to restore automatically the mean value of its dimension corresponding to that of said "standard."

Another object of the invention is to provide means establishing voltages proportional to "statistical overstepping" of the local dimensions of the object in relation to a pre-adjusted "critical limit or dimension." By the term "statistical overstepping" throughout the description which follows, is meant the relative number of individual measurements, operated within a fixed time period, the resultant of which exceeds a certain preregulated value termed "critical limit or dimension" either in relation to the importance of the value exceeding the local measurements or in relation to their relative number.

Another object of the invention is to provide means establishing a differential voltage between that representing the value of the "statistical overstepping" and another regulable voltage constituting a "standard" that one desires to impose as the measure of the "statistical overstepping" during the manufacture of the object measured, said differential voltage being utilized to drive a member regulating the value of the "standard" of the mean diameter set forth above so as to reset the value of the "statistical overstepping" to the value of the "standard" of this "statistical overstepping."

In the specific case of the manufacture of electric cables the apparatus of this invention affords a substantial reduction in the consumption of insulating material used for coating the cable.

In order to afford a clearer understanding of this invention and of the manner in which the same may be carried out in practice, reference will now be made to the attached drawings illustrating diagrammatically a typical form of embodiment of the invention. In the drawings.

FIGURES 3 and 3a assembled along the line a-b constitute together a block diagram of an apparatus constructed according to the teachings of this invention; and FIGURES 4 and 4a are the wiring diagrams of the blocks shown in FIGS. 3 and 3a respectively.

Figure 1:
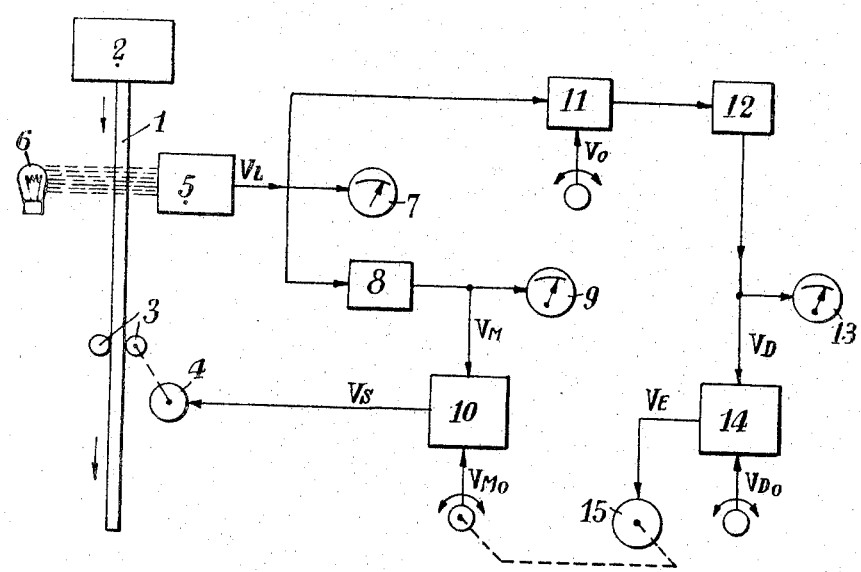
FIGURE 1 is a block diagram of the apparatus of this invention.

In FIG. 1 the apparatus of this invention is used for controlling the transverse dimension of an electric cable 1 being coated with a layer of insulating material by means of a so-called extruder or like machine 2. This extruder well known in the manufacture of electric cables comprising a conductor coated with an insulating layer comprises a reservoir into which the high-viscosity product adapted after cooling and/or curing to solidify and constitute the insulating sheath of the cable is injected by motor-driven, constant-output means. The metal conductor of this cable centered with respect to the reservoir and conducted through a pair of circular apertures formed in two opposite faces of this reservoir is thus caused to pick up by capillarity a coating of sufficient and substantially constant thickness of insulating product. Under these conditions, the cooling and curing of the cable develop a substantially uniform insulating layer. The cable 1 is pulled at the outet end of the extruder 2 by means of a mechanical device 3 (tension winch or capstan) rotatably driven from an electromotor 4. The cable is pulled at a substantially constant rate by the tension winch or capstan 3 and under these conditions, it is obvious that a change in the velocity of rotation of this tension device 3 is attended by a corresponding variation in the thickness of the insulating layer surrounding the metal conductor of the cable, since the insulating substance flows under constant-rate conditions. The measuring device proper is designated diagrammatically at 5. This measuring device may be of any type well known to those conversant with the art, utilizing as a rule the principle of photoelectric cell measurement. To this end the variation in the light flux emitted from a source 6 and partially blocked by the cable 1 is detected. Due to the capillarity effect the layer of insulating substance accumulates uniformly about the metal conductor 1 to constitute the cable, whereby a single measurement of the apparent diameter of the insulating sheath is statistically determinant as far as the estimation of the thickness of the insulating layer in all the planes containing the cable axis is concerned. An electric voltage $V_L$ corresponding to the local value of the object to be measured, as shown by the voltmeter 7, is delivered across the output terminals of this device 5.

According to this invention this voltage $V_L$ is applied to a time constant circuit 8 which ensures the integration and produces an output voltages $V_M$ which represents a mean value of the cross-sectional dimension of the measured object. This voltage $V_M$ may be applied to one or more measuring instruments 9 for giving the direct reading of this mean value.

On the other hand, the voltage $V_M$ defining the mean dimension is electrically opposed in the circuit 10 to another regulable voltage $V_{Mo}$, this latter voltage defining the mean dimension that one desires for the object measured during its manufacture which dimension is designated by "standard" of the mean dimension. The differential voltage $V_S$ which results from the opposed voltages $V_M$ and $V_{Mo}$ can be utilized for actuating automatically, as a function of its sign and of its value, a factor for modifying in the appropriate manner the diameter of the measured object during its manufacture so as to reset automatically the mean dimension to the value of said "standard" of the mean dimension, that is, by equalizing the voltages $V_M$ and $V_{Mo}$.

To this end, the differential voltage $V_S$ may control the electromotor 4 of capstan 3 in order to accelerate or retard its speed according to the sign of this voltage $V_S$.

According to this invention the voltage $V_L$ is also used for producing a voltage proportional to the "statistical overstepping" of a "critical dimension" by the dimension of the measured object. The term "statistical overstepping" means the relative frequency of the local measurements showing values exceeding a "critical dimension" selected to comply with the requirements set upon the object or article being manufactured (for example the minimum thickness of the insulating layer of a cable).

In FIGURE 1, the voltage $V_L$ which represents the local value of the dimension measured is applied to a circuit 11 which only transmits it when its value exceeds in a predetermined direction an adjustable voltage $V_o$ which represents the "critical dimension" specified. The output voltage from the circuit 11 is applied to an integrating circuit 12 which provides a voltage $V_D$ proportional to the mean value exceeding the local measurements in relation to this "critical dimension." The voltage $V_D$, which corresponds to this "statistical overstepping" is read directly by a measuring instrument 13.

According to one characteristic feature of the apparatus, the voltage $V_D$ which represents the "statistical overstepping" may be opposed in the circuit 14 to another voltage $V_{Do}$ either fixed or adjustable, which corresponds to the "standard" of the "statistical overstepping," in other words having a value which one desires to assign to this statistical overstepping. The circuit 14 provides an output voltage $V_E$ representing the discrepancy between the voltages $V_D$ and $V_{Do}$. This voltage $V_E$ is applied to a servo-motor 15 which, through the medium of reducing gear, controls the modification of the voltage $V_{Mo}$ which corresponds to the "standard" of the mean dimension of the object during its manufacture. In consequence, when the "statistical overstepping" is different from the "standard" that is, when $V_D$ is different from $V_{Do}$, the servo-motor 15 will vary the "standard" of the mean dimension, that is to say the voltage $V_{Mo}$, so that the differential voltage $V_S$ governs the conditions in manufacture of the measured objects in such a manner as to keep constant and equal to the value of the standard required for the statistical overstepping, that is $V_D = V_{Do}$.

Figure 2:
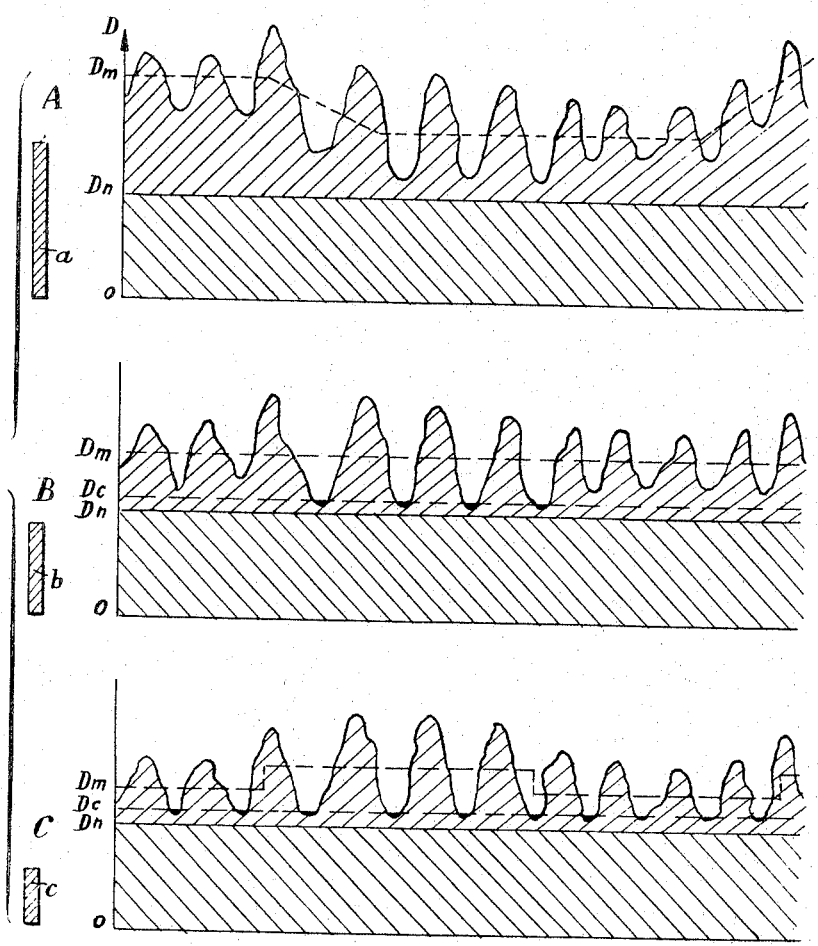
FIGURE 2 shows at A, B and C three diagrams illustrating the variations in the cross-sectional dimension of the insulating layer of an electric cable in different cases.

In FIG. 2 (A, B and C) the variation in the local thickness of the insulating layer or in the local diameter of a cable during its manufacture is shown diagrammatically by means of a thick line. This diameter D is the sum on the one hand of the rate diameter which is fixed and constitutes the minimum local diameter that can be tolerated for warranting the prescribed electrical property of the cable, which rated diameter is represented by the straight line $D_n$, and on the other hand of the "overload" necessary for keeping the local diameter above the value of the rated diameter, this overload being represented by the area obtained between the thick line (local diameter) and the aforesaid straight line $D_n$. The dotted line $D_m$ designates the mean diameter of the cable which results from variations in its local diameter in time periods of a duration of the order necessary for modifying the cable diameter being manufactured, with due consideration for the time lag elapsing between this control action and the machine response (notably for the variation in the speed of capstan 3). The straight line $D_c$ designates the "crtical diameter" selected to a value slightly greater than the "rated diameter," the over-stepping of this critical diameter by the lower values of the local diameter being nevertheless still permitted. The statistical measurement of the frequency of these oversteppings (see the black areas of the thick line curve) constitutes the "statistical overstepping" and permits of effecting by means of the apparatus of this invention, as already explained with reference to FIG. 1 (in addition to the control of the mean diameter as a function of the "standard" of this diameter through the capstan control, as described hereinabove), also the automatic variation of the "mean diameter standard" having the function of keeping this statistical overstepping at a fixed value. The "critical diameter" $D_c$, to which corresponds the voltage $V_o$ of FIG. 1, and the corresponding permissible value of the "standard of statistical overstepping" to which corresponds the voltage $V_{Do}$ of FIG. 1, are so selected that as long as the actual statistical overstepping does not exceed this value of the "standard" the local diameter will pratically never drop below the said "rated diameter."

In the three diagrams A, B and C of FIG. 2, the thick line curve shows the same short-period variations of the local diameter, assuming that the critical diameter is just overstepped by the minimum values of this local diameter, thus preserving the requisite cable quality (the local diameter never attaining under these conditions the minimum value designated by the term "rated diameter").

Curve A corresponds to the case of the operation of an extruding machine without using the apparatus of this invention. In this case, the thickness of the necessary "overload" of insulating material which is proportional to the surface area between the continuous curve and the straight line $D_n$, should be relatively important, so that in spite of relatively substantial variations which can hardly be foreseen in the local diameter, the rated diameter will in no case be attained. The corresponding volume of insulating material, which varies as the square of the variation in the overload thickness, is represented by the rectangle $a$.

Curve B corresponds to the control of the mean diameter by the fixed "standard of mean diameter" designated by the dotted line $D_m$. In this case the thick line curve representing the short-period variations in local diameter which are the same as those of curve A can be partially "rectified" due to the compensation of the slow fluctuations in the diameter (the dotted line representing the fixed mean diameter by means of a straight line), and the value of the "overload" may therefore be reduced. The corresponding volume of insulating material is designated by the rectangle $b$.

Curve C corresponds to the case of a complemental control of the "standard of mean diameter" adjustment as a function of the measurement of the "statistical overstepping." The short-period variations in the local diameter, which are shown by a thick line, remain still the same as in the preceding cases, but the mean diameter may be reduced with respect to these preceding cases within certain time intervals during which the short-period local variations are less important (the dotted-line curve $D_m$ designating the mean diameter is a broken line in this case). The resultant reduction in the volume of the aforesaid overload is shown diagrammatically by a rectangle $c$.

It must be emphasized that while the diagrams B and C illustrate a state of operation which can be maintained permanently, thus warranting not only the reduction in the volume of insulating material but also the maintaining of the cable quality (constancy of statistical over-stepping). The same does not apply to diagram A, for in this case the variations in local diameter are neither stabilized nor adapted to be foreseen during the long periods of operation. These variations may become momentarily or even permanently very important and thus produce an excess over the rated diameter and as a rule this fact can be neither detected if it is of short duration, nor compensated with a sufficient rapidity if it becomes permanent. Under these conditions, the main useful effect of the apparatus of this invention resides in the stabilization of the cable quality under the control of this apparatus.

According to a modified form of embodiment of this invention, the output voltage of circuit 11 (FIG. 1) whereby the electric voltage $V_L$ representing the local value of the measured dimension is compared with the voltage $V_o$ representing the critical dimension, may be converted into a constant value, for example through the medium of a monostable multivibrator producing a signal of fixed duration which is released by the auxiliary signal in order to develop in the integrator circuit 12 a charge responsive only to the frequency with which a predetermined dimension is overstepped, not to its amplitude. Thus, a non-balanced statistical measurement of the oversteppings is obtained.

This last datum may be used as in the preceding procedure for automatically controlling the variation in the dimension of the manufactured object. In fact, this effect can be obtained automatically by driving the slider of a potentiometer set on the standard $V_{Mo}$ by means of an electromotor 15 associated with a relay for reversing the direction of rotation of this motor, this relay being responsive to the voltage corresponding to the statistical difference $U_V$. Under these conditions and for a predetermined adjustment of the voltage value at which said reversing relay is energized (this voltage value corresponding to a predetermined value of the statistical function contemplated) the mean diameter is kept initially at a pre-adjusted value and subsequently altered in one or the other direction according to the variation in this statistical measurement, whereby the value of this statistical measurement remains unchanged in spite of possible variations in the manufacturing conditions depending on the nature of the materials utilized, the adjustment and general condition of the machine, and other factors likely to affect the fluctuations in the dimensions of the manufactured object.

Reversing the direction of rotation of the electromotor 15 produces a gradual shift of the slider controlling the standard of the mean dimension $V_{Mo}$ which, if other cares were not taken, would be stopped only when the change in the adjustment of the machine alters the statistical resultant of the dimensions of the manufactured object which controls the direction of rotation of the motor 15. If the machine control is purposely retarded so that only mean values integrated during a sufficient time period are capable of acting thereupon, this device may produce a very slow stabilization occurring only after oscillations of a certain duration. To produce this time the charge of the intergrating capacitor provided in the statistical overstepping measuring device 12 may be altered in a suitable direction, this device controlling the above-mentioned relay and being responsive directly to the very rotation of said motor 15, so that for each difference in the charge of this capacitor which is due to the modification of the value of the statistical overstepping $V_D$ to be compensated, this motor will perform but a number of revolutions substantially proportional to this discrepancy. To this end, a pulse generator, for example a cam-actuated switch driven from the motor 15, delivers periodically to this capacitor a predetermined quantity of current of a polarity depending on its direction of rotation. This switch may be so designed, for example, as to cause auxiliary, low-value capacitors to be connected alternatively now with a voltage source which is the same as that feeding said motor (and changing its polarity with the motor rotation), now with the above-mentioned integrating capacitor either directly or through the medium of a reversing relay.

Now an electrical circuit of the apparatus according to the invention will be described with reference to the block diagram of FIGS. 3 and 3a and to wiring diagrams of FIGS. 4 and 4a. In these last-named figures the portions surrounded by dotted lines correspond to the rectangles of the block diagrams and are designated by the same reference numerals. The signals produced by the various components illustrated in the block diagrams are indicated above the connections issuing from these components.

In these figures the measuring apparatus proper which measures the diameter of the cable 1 is that described in detail in my copending patent application Ser. No. 32,643, filed on May 31, 1960, and entitled "Device for Measuring the Width of Diameter of Fixed or Movable Tapes, Wires, Tubes, Bars and the Like."

This measuring apparatus comprises a disc 16 interposed in the path of the light flux emitted from the source 6 and received by the photoelectric cell 17, this disc 16 being formed with a series of alternate opaque teeth and transparent slots for modulating the light flux. When this light flux is blocked by the cable 1 of which the diameter is being measured, the result, as already explained in detail in my aforesaid copending patent application, is that the current from the photoelectric cell 17 produces, for a given cable diameter, a sequence of even pulses having substantially the same amplitude and of odd pulses (or vice-versa) characterized by a progressive decrease, a cancellation and a sign reversal beyond a certain number of pulses, depending on the diameter of this wire. This current is amplified in the amplifier 18, derivated in element 19 and further amplified in element 20, this amplification being adjusted by a detection of the signal at 21 and a biasing of a variable-slope lamp producing an output signal of substantially constant average value and presenting a minimum for odd signals. This signal is then amplified and chopped in element 24 and then synchronizes a monostable multivibrator 25 which produces a series of pulses of equal duration slightly inferior to that separating two adjacent odd pulses, except in the absence of the photoelectric signal or when this signal is minimum; in this last case this duration is increased due to the absence of any synchronization.

The signal issuing from this multivibrator is subjected to a first integration (and amplitude limitation) in a circuit 26 having a low time constant, then to a derivation attended by a selection of the maximum at 27 so as to produce a first high-amplitude pulse at the beginning of the scanning cycle and another one at the time corresponding to the oscillation of maximum duration issuing from 25.

The signal issuing from circuit 26 is further transmitted through an integrator circuit 28 having a high time constant and produces at the beginning of the scanning cycle and at the desynchronization moment of the monostable multivibrator 25 maxima of unequal amplitudes. This signal is combined in a mixer 29 with the short-duration signals from circuit 27 so as to produce at the output of 29 the appearance of short-duration voltage peaks exceeding a certain level at the beginning of the cycle as well as at the time of desynchronization of the monostable multivibrator 25. These two pulses undergo an amplitude selection at 30 and synchronize a bistable multivibrator 31 of which the output pulse 31a begins with the cycle and terminates at the time of the desynchronization of 25 under the influence of the signal from circuit 27.

The output signal of the monostable multivibrator 25 synchronizes another monostable multivibrator 35 generating signals 35a of short duration. The duration of signals 35$\bar{a}$ is controlled as a function of the mean voltage of the signal of the multivibrator which is detected by the circuit 36, with the consequence that this duration is stabilized.

Moreover, the pulses 31a from the bistable multivibrator 31 produce during their final part the synchronization of a monostable multivibrator 37 generating short duration signals 37a adapted to control a "gate" for transmitting the values to be measured to the integration circuits to be explained presently.

The pulses 35a from the monostable multivibrator 35 are fed to an integrator circuit 38 (FIG. 3a) developing a "stepped" integrated voltage comprising ten successive levels and adapted, when its amplitude attains the maximum value, to start the oscillation of a monostable multivibrator 39 causing the discharge of the integration circuits of 38. This discharge also takes place at the beginning of the cycle under the influence of the pulses 31b from the bistable multivibrator 31. The signal resulting from the "units" of which the "counting" may be "taken" at the time of the synchronization of the monostable multi-vibrator 25 is subjected to the action of the gate 40 responsive to the short-duration signal 37a of the monostable multivibrator 37, for transmitting the instantaneous value of the "units" integrator 38 to circuit 41 causing a detection of its peak value.

The thus integrated voltage $V_{MU}$ representing the mean value of the "units" is electrically opposed in the next circuit 42 to a voltage $V_{Mo}$ corresponding to the standard of the mean diameter and adjustable by means of the potentiometer 43. The voltage $V_s$ resulting from this opposition ($V_s = V_{MU} - V_{Mo}$) actuates a speed controller 22 controlling the speed of the electromotor 4 driving the capstan 3, to modify the diameter of the cable 1 during its manufacture. The voltage integrated in circuit 42 is fed at the same time to a measuring instrument 44 indicating the mean value $V_{MU}$ of the "units."

The pulses delivered by the monostable multivibrator 39 and controlling the discharge of integrator 38 actuate the integrator 45 similar to 38 and producing a "stepped" voltage representing the "tens" of pulses. This circuit comprises resetting means responsive (like the device 38) to the output signal 31b of the bistable multivibrator 31 at the beginning of the cycle. The integrated signal is passed through a "gate" 46 similar to gate 40 and responsive like this gate to the pulse 37a from the monostable multivibrator 37. The momentary "tens" voltage thus obtained is transmitted through a high time-constant circuit 47 and the output voltage $V_{MD}$ thereof actuates the measuring instrument 48 showing the "tens" value to be added to the reading of instrument 44 for defining the mean diameter of the cable.

To measure the "statistical overstepping" (by defect) the "units" voltage from integrator 38 is transmitted through an "amplitude selector" circuit 49 operating from a level corresponding to the voltage $V_o$ defining the aforementioned "critical dimension." This level is adjustable by means of a potentiometer 50. The output voltage of the amplitude selector 49 synchronizes immediately as it appears a monostable multivibrator 52 producing a signal the phase of which depends on the adjustment of the potentiometer 50. The signal of this monostable multivibrator synchronizes another, bistable multivibrator 53 the output signal of which is electrically opposed to that issuing from a multivibrator 54 synchronized by the output pulse 37a of 37 corresponding to the de-synchronization of the monostable multivibrator 25 and restored to its initial state at the same time as the multivibrator 53 by the pulse from the monostable multivibrator 39 corresponding to the end of the "units." The two voltages from multivibrators 53 and 54, which are electrically opposed at a gate 55, produce a difference constituting a signal the duration of which depends on the discrepancy between the voltage $V_o$ pre-adjusted by the potentiometer 50 and the voltage indicating the number of "units" in the local diameter. The resulting signal acts upon the "gate" 56 transmitting a number of pulses 35a from the monostable multivibrator 35 which is proportional to this duration. These pulses actuate the integrator 57 discharged at the end of the scanning cycle by the pulse 37a from the monostable multivibrator 37, with the result that the duration of the maximum integrated voltage is increased. This voltage is subsequently transmitted through an (adjustable) circuit 58 having a high time constant and the output voltage $V_D$ of which permits of reading on the instrument 59 the value of the "statistical overstepping."

The integrating capacitor of the circuit 57 is shown in FIGS. 3a and 4a. It may assume two very different values according as the switch 23 is in position "1" or position "2." The integrator 57 comprises in addition a device for limiting the maximum integrated voltage. As a result, when the switch 23 introduces a relative large capacity into its circuit, the integration takes place normally at each incident pulse, without attaining the level set by the limiter. When on the contrary the low capacity is switched on, the level set by the limiter is attained after the incidence of a single pulse and the incidence of the other pulses will not change the output voltage. Thus, a "weightended statistical overstepping" indication (as a function of the difference between the local diameter and the "critical diameter") in the first case and an "unweightened statistical overstepping" indication in the other case are provided.

The voltage $V_D$ corresponding to the "statistical overstepping" is opposed at 60 to another voltage $V_{Do}$ corresponding to the "standard" of the statistical overstepping. This voltage $V_{Do}$ is adjustable by means of the potentiometer 61.

The output voltage $V_E$ of the circuit 60 which results from the opposition of both voltages $V_D$ and $V_{Do}$ energizes a relay 62 controlling through a reversing switch 62a the reversal of the direction of rotation of the motor 15 controlling through the medium of a reducing gear the sliding contact of the potentiometer 43 providing the definition of the mean diameter "standard" of the wire or cable during its manufacture.

The rotation of this motor controls through the medium of a cam 64 and a reversing switch 65 a periodic discharge of the integrating circuit of element 60 (controlling the relay 62 and adapted to be separated from that feeding the instrument 59), with the consequence that the "statistical overstepping" voltage $V_D$ opposed to the voltage output $V_{Do}$ corresponding to the standard adjusted through the potentiometer 61 is restored to zero value after a number of revolutions of the motor 63 which corresponds to its initial value and that the oscillations of the assembly comprising this apparatus and the devices (motor 4, capstan 3) controlling the cable diameter during its manufacture are damped out.

The rotation of this motor is adapted, through a cam 64 and a reversing switch 65, to produce a periodical discharge of the integrator circuit 60 controlling the relay 62 and which may be separated from the circuit energizing the instrument 59, thus restoring the "statistical overstepping" voltage opposed to the voltage $V_{Do}$ of the standard display by the potentiometer 61 to zero value after a number of turns of motor 15 which corresponds to its initial value and damping the oscillation of the assembly comprising this apparatus and the devices (such as motor 4, capstan 3) affecting the cable diameter during the manufacture.

What I claim is:

1. Apparatus for controlling the transverse dimension of an object of elongated shape such as a wire or cable during its manufacture in a machine, comprising an electrical measuring circuit delivering an output voltage corresponding to the local value of the measured transverse dimension, a first integrator circuit for establishing the mean value of said output voltage and thus produce a voltage proportional to the mean dimension of the measured object, a first electrical circuit adjustable to produce a first differential voltage corresponding to the difference between the voltage representing the mean value of the dimension of the measured object and a first pre-adjusted voltage corresponding to a "standard" of the mean dimension which it is desired to impart to said mean value during the manufacture of the measured object, a threshold electrical circuit for transmitting the output voltage of said electrical measuring circuit only when its value exceeds a predetermined value corresponding to a critical dimension of the measured object, and a second integrator circuit for producing the mean value of the thus transmitted differential voltage in order to develop a voltage proportional to the statistical overstepping of the dimension of the measured object in relation to said critical dimension, a second electrical circuit adjustable for opposing the voltage proportional to the statistical overstepping to another pre-adjusted voltage representing a requisite, so-called "standard" value, of the satistical overstepping, and producing at its output a resultant second differential voltage, means controlled by said resultant second differential voltage for controlling the adjustment of said first pre-adjusted voltage corresponding to the "standard" of said mean dimension, in order to maintain to a fixed value equal to its "standard," the statistical overstepping of the dimension of the measured object during its manufacture, and means to which said first differential voltage is applied, said last-named means being adapted to control the machine producing the measured object, as a function of said first differential voltage, in order to maintain to a fixed value equal to its "standard" the mean dimension of the measured object.

2. Apparatus according to claim 1, comprising means for restoring to a constant value the differential voltage transmitted from the output of said threshold-type electrical circuit comparing the output voltage to the limit pre-adjusted at each cycle of measurement during which said differential voltage appears, in order to deliver at the output of said second integrator circuit a non-weightened indication of the value of the statistical overstepping, that is, which is proportional to the mean number of oversteppings of the output voltage in relation to the aforesaid pre-adjusted limit without depending on the magnitude of said oversteppings.

3. Apparatus according to claim 1, wherein the means controlling the adjustment of the first preadjusted voltage comprise an electromotor having two directions of rotation, a pulse generator driven from said motor and producing pulses of which the sign depends on the direction of rotation of said motor, the number of said pulses being proportional to the number of revolutions of said motor, an auxiliary integrator circuit to which said pulses are fed and delivering at its output an auxiliary voltage transmitted to said second integrator circuit so as to be added therein to the voltage proportional to the statistical overstepping, to limit the displacement produced by said motor and reduce the time necessary for damping out the oscillation likely to be produced thereby.

References Cited

UNITED STATES PATENTS

| | | | |
|---|---|---|---|
| 2,785,353 | 3/1953 | Fenemore | 318—28 |
| 3,017,801 | 1/1962 | Ingber | 88—14 |
| 3,121,354 | 2/1964 | Weremeychik et al. | 72—15 |
| 3,170,140 | 2/1965 | Brucker | 72—15 |

OTHER REFERENCES

Automation; March 1956, pp. 52–57; "Continuous Gaging," by A. S. Urano.

Iron and Steel Engineer; February 1957, pp. 99–108; "Electrical Systems for Hot Strip Mills," by R. E. Maus.

RICHARD J. HERBST, *Primary Examiner.*